(12) United States Patent
Mascolo

(10) Patent No.: US 7,593,335 B2
(45) Date of Patent: Sep. 22, 2009

(54) RATE BASED CONGESTION CONTROL FOR PACKET NETWORKS

(76) Inventor: Saverio Mascolo, Corso di Vittorio, 12, 75022 Irsina (IT)

( * ) Notice: Subject to any disclaimer, the term of this patent is extended or adjusted under 35 U.S.C. 154(b) by 365 days.

(21) Appl. No.: 10/569,913

(22) PCT Filed: Aug. 12, 2004

(86) PCT No.: PCT/IB2004/002633

§ 371 (c)(1),
(2), (4) Date: Nov. 15, 2006

(87) PCT Pub. No.: WO2005/022845

PCT Pub. Date: Mar. 10, 2005

(65) Prior Publication Data

US 2007/0165524 A1    Jul. 19, 2007

(30) Foreign Application Priority Data

Aug. 29, 2003   (IT)   .................. BA2003A0039

(51) Int. Cl.
*H04L 12/26*    (2006.01)
(52) U.S. Cl. ..................................... 370/235
(58) Field of Classification Search ............... 370/235, 370/229, 231, 232, 233, 234
See application file for complete search history.

(56) References Cited

U.S. PATENT DOCUMENTS 4,629,977 A * 12/1986 English ................ 324/76.51
6,144,639 A * 11/2000 Zhao et al. ............... 370/235
7,099,273 B2 * 8/2006 Ha et al. .................. 370/229
7,299,280 B2 * 11/2007 Gerla et al. ............... 709/224
7,304,951 B2 * 12/2007 Rhee ....................... 370/235
7,464,173 B1 * 12/2008 Tryfonas .................. 709/233
2002/0085587 A1  7/2002 Mascolo

OTHER PUBLICATIONS

Grieco and Mascolo, "Smith's predictor and feedforward disturbance compensation for ATM congestion control," *Proceedings of the 41st IEEE Conference on Decision and Control*, Las Vegas, Nevada, pp. 987-992, Dec. 2002.
International Preliminary Report and Written Opinion, Application No. PCT/IB2004/002633, 9 pages, Feb. 28, 2006.
Mascolo, "Congestion control in high-speed communication networks using the Smith principle," *Automatica* 35, pp. 1921-1935, May 1999.

* cited by examiner

*Primary Examiner*—Derrick W Ferris
*Assistant Examiner*—Mohammad Anwar
(74) *Attorney, Agent, or Firm*—Klarquist Sparkman, LLP

(57) ABSTRACT

The invention herein described consists of a method to compute in a end-to-end fashion the sending rate of data, audio and video flows over a packet switching network such as the Internet Protocol Network. The sending rate is computed as a function of the data sent in the recent past and as a function of a probing function w(t) that is dynamically set by taking into account signals of network congestion and the network changing available bandwidth.

12 Claims, 4 Drawing Sheets

RATE BASED CONGESTION CONTROL FOR PACKET NETWORKS

The present application is a National Stage Application of PCT/IB2004/002633, which claims priority to Italian Patent Application No. BA2003A000039, filed Aug. 29, 2003 in Bari, Italy. This application includes matter protected by copyright.

BACKGROUND OF THE INVENTION

1. Technical Field

This invention relates generally to efficient communication over packet switching networks. More particularly, the invention proposes a rate-based congestion control mechanism to send data, audio and videos over packet networks such as the Internet. The invention improves the efficiency in transferring data, audio and video over of the wired and especially the wireless Internet Protocol.

2. Description of the Related Art

The use of the Internet to carry potentially high-quality video is continuously growing. Integration of quality adaptive encoding schemes, forward error correction techniques and congestion control algorithms is crucial to provide an effective video delivering system. Encoding drastically reduces the number of bits used to transmit the video; error correction techniques ensure loss resilience by adding redundancy data; congestion control algorithms discover the available bandwidth into the network. Integration of congestion control with quality adaptation is the key strategy to provide efficient video delivering over time varying capacity networks, such as the Internet, so that when the available bandwidth is scarce a low quality video is transmitted whereas, when an abundant bandwidth is available, video of improved quality is delivered. A generic video delivering system, which integrates all the functions described above, is shown in FIG. 1 and consists of the following modules:

- The Rate Controller, which throttles the transmission rate and reports to the Bandwidth Allocator module the available bandwidth and the loss rate.
- The Bandwidth Allocator, which allocates the available bandwidth to the Layer Selector and the Loss Resilience blocks by taking into account the available bandwidth and the loss rate.
- The Layer Selector selects the layers to be sent by taking into account the share of available bandwidth assigned by the Bandwidth Allocator and the state of the client buffer.
- The Loss Resilience block adds redundancy data to the layers by taking into account the loss rate and the share of bandwidth assigned by the Bandwidth Allocator.
- The Receiver, which sends the feedback information to the Rate Controller to establish a closed-loop control.

Traditional video encoders assume constant network capacity and low loss rate thus creating bit streams that have poor quality when transported over the Internet where both bandwidth and loss rate are unpredictable and time-varying. Either a higher loss rate or a lower bandwidth would produce visual artifacts that propagate with time. Such encoders are not well suited for a video delivering system where the key issue is to properly regulate the quality of the delivered video and the amount of FEC codes to match the available bandwidth and to compensate the packet loss rate.

Over the years, several solutions have been proposed for encoding and transmitting video streams over time-varying networks. One-layer Encoding achieves a trade-off between compression and resilience to errors by properly choosing the Intra-blocks to encode without temporal prediction (i.e. without taking into account the contents of previous or successive frames) in order to avoid error propagation.

To achieve dynamic quality adaptation, a common solution is to deploy an encoding-specific packet dropping algorithm, which discards packets that contain lower-priority information to match transmission rate with channel bandwidth. This approach provides acceptable results just over a limited range of rates, which in turn depends on the specific media content and on the adopted encoding scheme.

Multiple Description (MD) coders use a multiple description video encoder. MD encoding addresses the problem of encoding a source into two bitstreams so that high-quality reconstruction is decodable from the two bitstreams together, while a lower, but still acceptable, quality reconstruction is decodable if either of the two bitstream is lost. MD coders are typically more robust to uncertainties in the channel loss rate at the time of encoding. However, they still require network support to match the varying channel bandwidth.

Simulcast is the simplest technique that has been proposed to achieve quality adaptation; it employs several encoded versions of the same video obtained by varying the target encoding bit-rate. The drawback of the simulcast approach is that the several versions of the same video are independent to each other and data belonging to one version cannot be used by another version. Consequently, when the source switches the quality of the delivered video to match the available bandwidth, the data already sent to the receiver and not yet played back cannot be related to the new ones.

Multicast and Layered Encoding is based on hierarchical encoding techniques, which encode the video in several layers arranged in one base layer and more enhancement layers. The video quality can be progressively adapted by adding layers when more available bandwidth is discovered and striping layers when the available bandwidth decreases. Hierarchical encoding requires sophisticate encoders but guarantees that the layers composing the video can be integrated with each other so that when the sender adds a new layer, the data already sent to the receiver and not yet played back can be integrated with the new ones. Changing the number of transmitted layers to match the available bandwidth relaxes the need for knowing exact channel bandwidth at the time of encoding, which helps to decouple transport and encoding algorithms. The decoupling allows gradual integration of improved hierarchical encoders with sophisticated rate control algorithms to take place incrementally.

During the last decade, research on congestion control algorithms has been quite active. It has been essentially focused on congestion control for "best effort" reliable traffic. The current version of Transmission Control Protocol (TCP) congestion control is still largely based on the cornerstone paper by Van Jacobson and on its modifications (such as TCP New Reno etc.). It is used in the leading Unix, Linux TCP protocol suite or in the Microsoft Windows® TCP protocol suite.

We list here main modifications proposed for TCP Reno. TCP with Selective Acknowledgments (TCP SACK) introduces a more refined mechanism to acknowledge data. TCP New Reno introduces a mechanism to recover from many losses in a window of data. Westwood+TCP exploits a new paradigm: the key idea of TCP Westwood is to exploit the stream of returning acknowledgment (ACK) packets to estimate the bandwidth that is available for the TCP connection. This bandwidth estimate is then used to adaptively decrease the congestion window and the slow-start threshold after a timeout or three duplicate ACKs.

Classic TCP is window based: this feature causes burstyness in data transmission; bursty data sources not only require large playout buffers at the client side to provide a smooth playout but also experience bursty packet losses that makes difficult the recovery via forward error correction techniques. Hence, while TCP congestion control is well suited for applications not sensitive to delay jitter and abrupt transmission rate changes, such as FTP data transfer, it is not recommendable to deliver video data, whose perceived quality is sensitive to both delay jitter and abrupt changes in the sending rate. To the purpose, several rate based congestion control algorithms have been proposed to be integrated into the general video delivering framework described at the beginning of the section.

A congestion control algorithm well suited for video delivering should ensure a reduced jitter of arriving packets and a smooth dynamics of the transmission rate in order to reduce playout buffering at the receiver. Moreover, friendliness towards Reno sources is necessary to provide a fair bandwidth allocation to flows carrying multimedia and bulk data.

In order to provide friendliness, many control algorithms have been proposed that try to emulate the "long-term" behavior of the Reno algorithm but with a slower responsive dynamics. The TEAR (TCP Emulation at Receivers) rate control algorithm computes the input rate at the receiver and then feeds it back to the sender. The rate is computed by emulating the average long-term throughput of one hypothetic Reno connection traversing the same path of the rate based connection. It has been shown that TEAR does not employ the classic self-clocking mechanism, it is not friendly towards Reno TCP at high loss rate and it does not reduce its sending rate under persistent congestion.

Nowadays, the leading algorithm is the TCP Friendly Rate Control (TFRC), which tries to emulate the long-term behavior of the Reno throughput. TFRC aims at obtaining a smooth transmission rate dynamics along with friendliness towards Reno TCP. To provide friendliness, a TFRC sender emulates the long-term behavior of a Reno connection using the long-term equation model of the Reno throughput. In this way, the TFRC sender computes the transmission rate as a static non-linear function of the average loss rate, which is sent by the receiver to the sender as feedback report. We have experimented that TFRC is not fair and is not friendly. We have experimented that TFRC experiences a very low performance over wireless links such as in the case of General Packet Radio Service (GPRS), 3G, 4G systems and satellite links, which are characterized by large delays and random loss.

Link layer proposals attempt to hide loss due to wireless links using local retransmissions and perhaps forward error correction over the wireless link. Examples of link layer protocols are Forward Error Correction (FEC) and Automatic Repeat Request (ARQ) that are used in Digital cellular systems, such as TDMA or CDMA.

The present invention drastically improves transport of data, and streaming of audio and video especially over wireless Internet. The present invention also improves real-time streaming of audio and video sources.

BRIEF SUMMARY OF THE INVENTION

It is a general object of the present invention to propose an end-to-end congestion control algorithm for sending data, audio and video over packet switching networks. This invention proposes a rate-based congestion control algorithm that is particularly suited to be integrated with adaptive encoding schemes in the general video delivering system pictured in FIG. 1. In particular it can be implemented in the rate controller module depicted in FIG. 1 for delivering quality adaptive audio/video over the Internet protocol, for example over the RTP/UDP/IP stack. The proposed rate-based congestion control algorithm is based on a mechanism to estimate both the used bandwidth and the queue backlog in a end-to-end fashion.

This invention can be used to improve the transmission rate of data, audio and video over IP over radio links such as the Group Special Mobile (GSM), the General Packet Radio Service (GPRS), the 3G, 4G or Universal Mobile Telephone System (UMTS), IEEE 802.11, IEEE 802.15, IEEE 802.16, and to increase the utilization of network bandwidth in the presence of connection with asymmetric bandwidth such as in the case of cable networks, (e.g. cable TV networks), direct broadcast satellite (e.g. an IP service using Digital Video Broadcast (DVB), with an interactive return channel), Very Small Aperture Satellite Terminals (VSAT), Asymmetric Digital Subscriber Line (ADSL), and several packet radio networks. These networks are increasingly being deployed as high-speed Internet access networks, and it is therefore highly desirable to achieve good transport performance. The present invention also increases the fairness in bandwidth utilization.

This invention can be used over the User Datagram Protocol (UDP) to stream audio/voice using adaptive coding. With the term adaptive coding we mean that the quality of coding takes into account the estimate of the available bandwidth. An example is layered coding, such as the MPEG-4 Fine-Grained Scalable Video Coding, in which the number of transmitted layers can be chosen by taking into account the estimate of available bandwidth.

The present invention can be used within an application conceived for real-time and running over the Real Time Protocol (RTP) that runs over the UDP protocol. The bandwidth estimate can be delivered from the receiver to the sender using the RTP Control Protocol.

The foregoing has outlined some of the more pertinent features of the present invention. Other features and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DESCRIPTION OF THE PREFERRED EMBODIMENT

Figure 2:
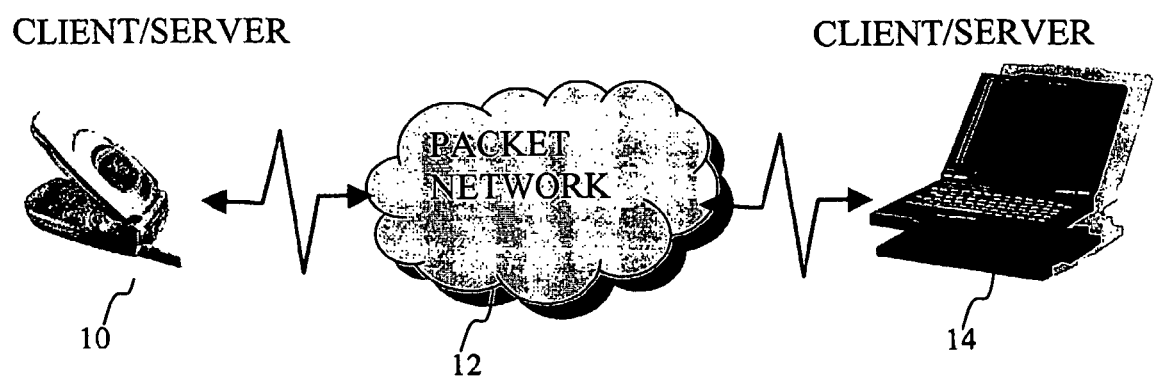
FIG. 2 is a representative system in which the present invention is implemented.

A known Internet client-server system is implemented as illustrated in FIG. 2. A client/server machine 10 is connected to a client/server machine 14 via a network 12. For illustrative purposes, network 12 is the Internet, an intranet an extranet, a satellite network or any other wireless or wired network. A client/server machine is a machine that can be a client, a server or a client-server such as in peer-to-peer applications. A representative server is a computer comprising a processor, an operating system such as Microsoft Windows®, Microsoft XP®, IBM OS/2®, Sun Solaris®, Unix, Linux, a Web server program such as Netscape Enterprise server®, Apache®, Microsoft Internet Information Server®. The server also includes an Application Program Interface (API) that allows an application developer to extend or customize some parameters of the transport layers such as the size of the socket buffers. The server can be a mobile server.

A representative client machine is a personal computer based on a processor such as Pentium®, Motorola® or RISC® processor that includes an operating system such as Microsoft Windows®, Microsoft XP®, IBM OS/2®, Sun Solaris®, Unix, Linux, a Web browser such as Microsoft Explorer® or Netscape Navigator® and application programs such as Real Networks® or Windows Media Player®. A client may also be a notebook computer, a PDA, a mobile client such as a cellular phone or any other device connectable to the computer network via a wired or wireless link such as a wireless local area network (i.e. IEEE 802.11, IEEE 802.15, IEEE 802.16), a HyperLan, Bluetooth, GPRS, 3G, 4G, UMTS. The client-server connection can also be between mobile hosts such as cellular phones, or PDAs. A client includes an operating system such as Symbian® Palm OS®, Microsoft's Windows Mobile for Smartphone® (WMS) and Linux.

A representative client/server machine is a personal computer or in general a mobile handset running peer-to-peer application for sharing files, audios, videos or applications for audio and video telephony over the Internet Protocol.

The present invention can be implemented in the TCP protocol suite of several operating systems such as Microsoft Windows TCP, Sun Solaris TCP, Symbian TCP, Palm OS TCP, Microsoft's Windows Mobile for Smartphone TCP and Linux TCP.

The present invention can also be implemented in applications running over the RTP/UDP protocol. Examples of these ones are applications that are designed for audio/video streaming, such as Real Networks® or Windows Media Player®, or for real-time conferencing.

Figure 3:
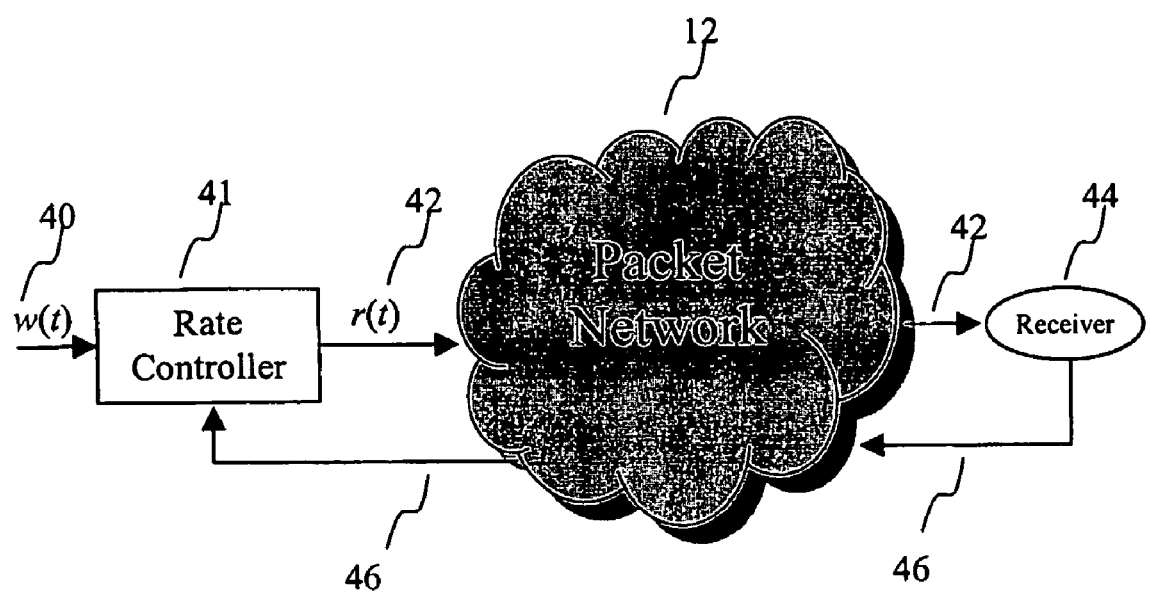
FIG. 3 is a representation of the rate controller implemented at the sender side of connection.

This invention proposes a rate based congestion control mechanism implemented in the rate controller 41 shown in FIG. 3. The present invention is designed for data transmission, for audio/video streaming and for real-time conferencing over a packet network 12. The invention can be used with adaptive coder such as the MPEG-4 Fine-Grained Scalable Video Coding within the general framework depicted in FIG. 1.

The schematic of the invention is depicted in FIG. 3. The application at the sender side computes the sending rate r(t) 42 that reaches the receiver 44 at the client side. The sending rate r(t) at time t is computed as follows:

$$r(t) = k \cdot \left[ \min(w(t), s(t)) - \int_{t-RTT}^{t} r(\tau) d\tau \right]^{+} \quad (1)$$

where:
k is a proportional constant;
$[x]^{+} = \max(0, x)$;
w(t) is a function that is shaped as it will be described in the sequel of this description;
s(t) is a function that is equal to infinity if no explicit congestion feedback is provided by the network to the sender or is equal to a proper value if a congestion feedback is provided by the network; for example, s(t) can be equal to the TCP Advertised Window or to the space available at the receiver buffer, or to the minim of the space available in the buffers along the connection path;
RTT is the round trip time;
min(w(t),s(t)) returns the minimum of w(t) and s(t).

Typical value of k is in the range $[0.1s^{-1}, 0.5s^{-1}]$ or $1/RTT_m$, where $RTT_m$ is the minimum round trip time.

The function w(t) 40 is a positive function that is shaped by following an Increasing Phase and a Decreasing Phase. The Increasing Phase is intended to probe network capacity and ends when congestion is hit. When congestion is hit the function w(t) enters the Decreasing Phase that is followed again by an Increasing Phase.

A particular efficient Increasing Phase is made of the two following phases named: (I) quick probing; (II) gentle probing.

During the quick probing the function w(t) is set as an increasing function that starts from a small value and increases quickly. A particular implementation of the quick probing phase is as follows:

$$w(t) = w(t_0) \cdot c^{\frac{t-t_0}{\alpha}} \quad (2)$$

where $t_0$ is the last time the quick probing phase was entered. Typical value of $w(t_0)$ is 2, typical value of $\alpha$ is in the range [0.1, 0.5] or is equal to $RTT_m$, typical value of c is 2 but it can be 3, 4 or more and any real value between these integers. Moreover c can assume values as a function of w(t), i.e. c=c(w). When w(t) is equal to a threshold value ssthresh, which is set at the beginning to a default value depending on the bandwidth capacity of the client connection link (f.i. 64Kbytes), the probing phase enters the gentle probing phase.

During the gentle probing the function w(t) is set as follows:

$$w(t) = w(t_0) + \frac{t - t_0}{\beta} \quad (3)$$

where $t_0$ is the time the gentle probing phase was entered. Typical value of β is in the range [0.1, 0.3] or equal to $RTT_m$. Also β can assume values as a function of w(t), i.e. β=β(w).

When a congestion episode happens it is necessary to trigger the shrinking phase in order to reduce the input rate. A congestion episode can be notified explicitly by routers implementing Explicit Congestion Notification (ECN) or, in current widespread routers, can be inferred by the following two events: (1) the sequence of received packets contains a hole so that a feedback report is sent by the receiver; (2) the sender does not receive any report from the receiver for a long time so that a timeout expires. Timeouts are computed following the standard TCP. The flow of feedback reports 46 is also represented in FIG. 3.

The sender reacts to congestion event at time $t_1$ notified by ECN or notified by n (typically n=3) duplicate acknowledgments (or feedback reports) by decreasing the function w(t) from the value $w(t_1)$ to the value $$w(t_f) = \hat{B}(t_1) \cdot \left( RTT_m + \frac{1}{k} \right)$$

at $t=t_1+RTT_m$ where $\hat{B}(t_1)$ is the available bandwidth at time $t_1$ and $RTT_m$ is the minimum round trip time. When $t=t_1+RTT_m$, the setting of w(t) again enters the gentle probing phase.

A particular setting of the decreasing function is the following linear decreasing function:

$$w(t) = w(t_1) - \frac{w(t_1) - w(t_f)}{RTT_m}(t - t_1) \quad (4)$$

where $$w(t_f) = \hat{B}(t_1) \cdot \left(RTT_m + \frac{1}{k}\right), \quad (5)$$

and $\hat{B}(t_1)$ is the available bandwidth $t=t_1$ and $RTT_m$ is the minimum round trip time. When $t=t_1+RTT_m$, the setting of w(t) again enters the gentle probing phase.

The sender reacts to congestion event at time $t_1$ notified by timeout by setting w(t) accordingly to:

$$w(t) = w(t_0) \cdot c^{\frac{t-t_0}{\alpha}} \quad (2)$$

where $t_0$ is the last time the quick probing phase was entered. Typical value of $w(t_0)$ is 2, typical value of $\alpha$ is in the range [0.1, 0.5] or is equal to $RTT_m$, typical value of c is 2 but it can be 3, 4 or more and any real value between these integers. Also c can assume values as a function of w(t), i.e. c=c(w). The threshold value ssthresh is set as follows:

$$ssthresh = \hat{B}(t_1) \cdot \left(RTT_m + \frac{1}{k}\right)$$

where $\hat{B}(t_1)$ is the available bandwidth $t=t_1$ and $RTT_m$ is the minimum round trip time. When w(t) is equal to ssthresh, the gentle probing phase is entered again.

To estimate the available bandwidth $\hat{B}(t)$, the receiver counts and filters the received packets. In particular, every Round Trip Time or every Smoothed Round Trip Time (SRTT), where SRTT is computed using the well-known Van Jacobson algorithm, a sample of used bandwidth B(i) at time $t_i$ is computed at the receiver as follows:

$$B(i) = \frac{D(i)}{T(i)} \quad (6)$$

where D(i) is the amount of data received during the last SRTT=T(i) or RTT=T(i). The routine can be implemented at the receiver, by counting received packets, or at the sender side, by counting acknowledgment packets. Since network congestion is due to low pass components of available bandwidth it is necessary to average the bandwidth samples B(i). This can be done using a time-varying filter such as:

$$\hat{B}(i) = \frac{2\tau_f - T(i)}{2\tau_f - T(i)}\hat{B}(i-1) + T(i)\frac{B(i) + B(i)}{2\tau_f + T(i)} \quad (7)$$

where $\hat{B}(i)$ is the filter output at time $t_i$, i.e. the available bandwidth $\hat{B}(t)$ at $t=t_i$, $\hat{B}(i-1)$ is the filter output at time $t_{i-1}$, $\hat{B}(i)$ is the bandwidth sample (6), $\tau_f$ is the time-constant of the filter (a typical value is $\tau_f=0.5$ s). When $T(i)>\tau_f/4$, we interpolate and re-sample using N=integer of $(4 \cdot T(i)/\tau_f)$ virtual samples B(i) arriving with interarrival time $T_v(i)=\tau_f/4$ in order to avoid aliasing effects.

In order to average the bandwidth samples B(i), a time-invariant filter can be used as the following $$\hat{B}(i) = \alpha \cdot \hat{B}(i-1) + (1-\alpha) \cdot B(i) \quad (8)$$

where typical value of $\alpha$ can be 7/8.

The available bandwidth $\hat{B}(t)$ is sent by the receiver side to the sender side using, for instance, feedback reports of the RTCP protocol.

The available bandwidth $\hat{B}(t)$ can be computed also by using a chain of filters in cascade, where filters of the chain are filters described above and where samples B(t) of available bandwidth are inputs of the first filter in the chain.

Figure 4:
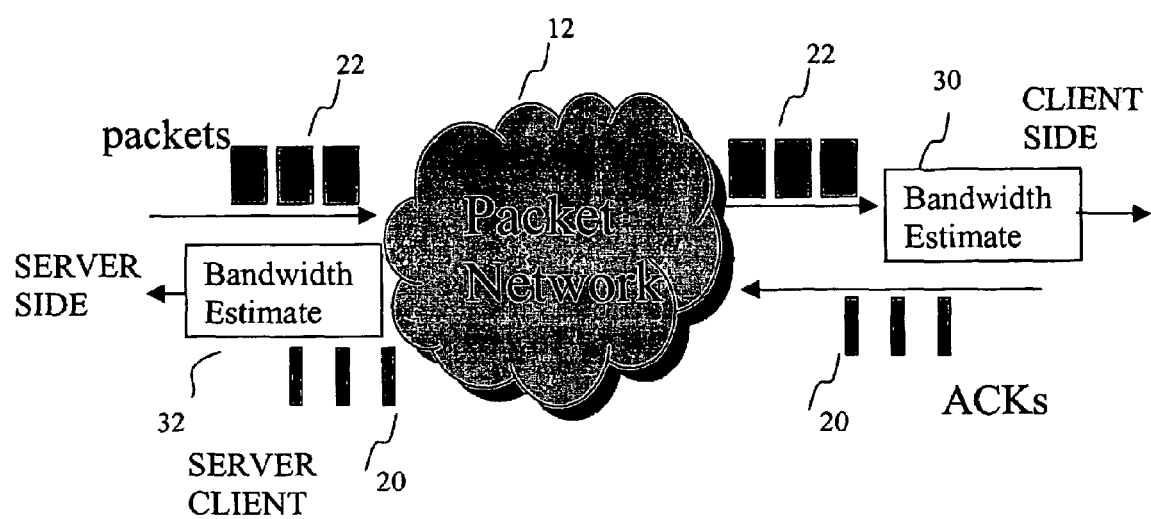
FIG. 4 is a representation of the bandwidth estimation implemented at the client side of the connection or at the server side.

The available bandwidth can be also estimated at the sender side by computing D(i) using the acknowledgment packets. FIG. 4 shows the two possible locations, which are 30 or 32, of the routine computing the available bandwidth. The flow of packets 22 goes from the sender to the receiver.

The flow of acknowledgment packets (ACKs) 20 goes from the receiver to the sender. This scheme, or other similar schemes that are based on a forward flow of data and on a backward flow of control data, is utilized for congestion control by protocol such as the TCP/IP protocol or the RTP Control Protocol or by other packet networks such as the Asynchronous Transfer Mode (ATM) networks. The flow of returning acknowledgment packets 20 are utilized by the routine 32 at the sender side to compute the available bandwidth whereas the flow of packets 22 are utilized by the routine 30 at the client side to compute the available bandwidth (see also US 2002/0085587).

Figure 1:
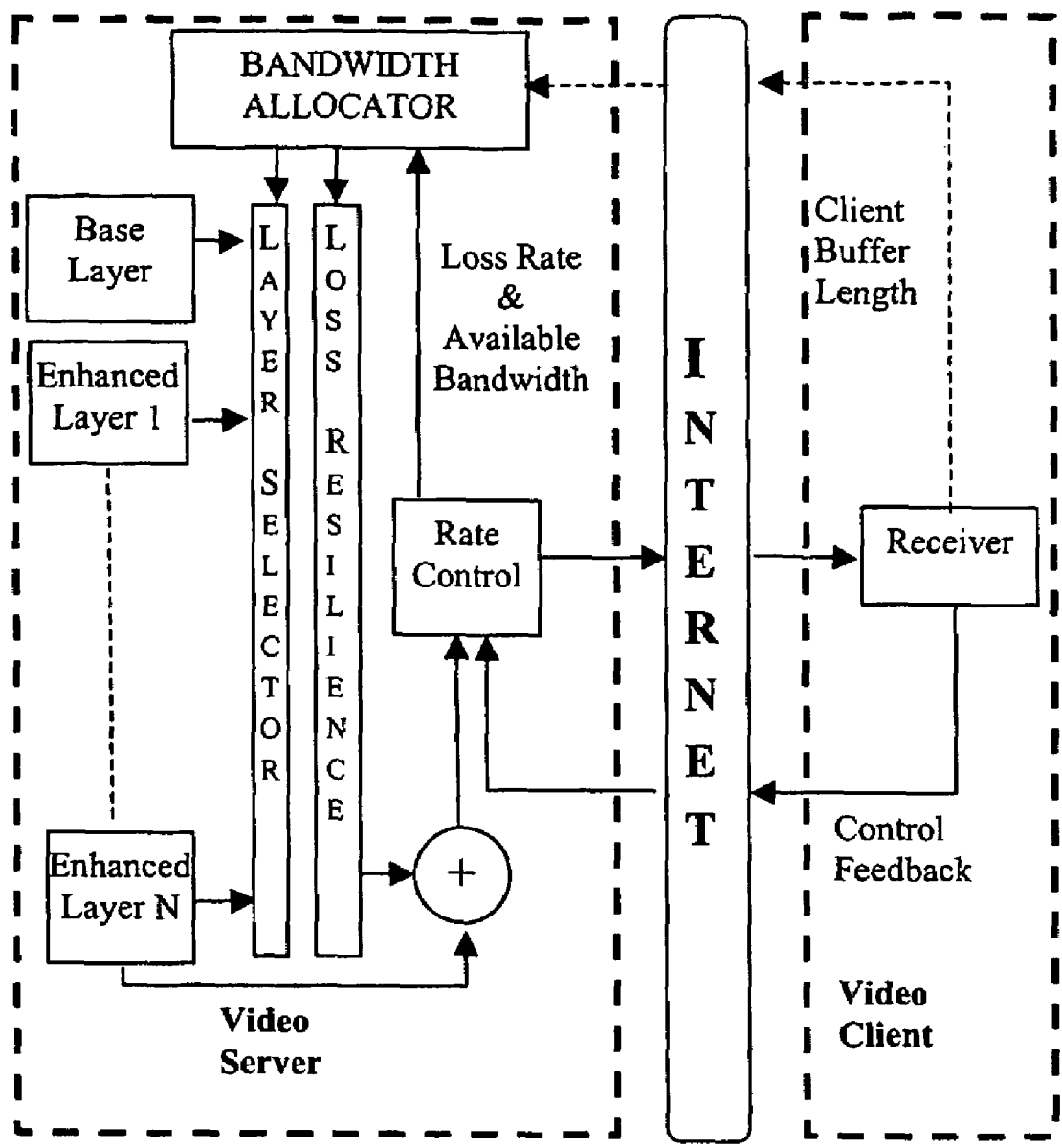
FIG. 1 is representative of general video delivering system.

The available bandwidth $\hat{B}(t)$ can be used to adapt the quality of audio/video to the network available bandwidth in the general framework shown in FIG. 1. An example is layered coding, such as the MPEG-4 Fine-Grained Scalable Video Coding, in which the number of layers to be transmitted could be chosen by taking into account the estimate of available bandwidth $\hat{B}(t)$.

Main advantages of the present invention are: (1) more efficient utilization of the network available bandwidth especially in the presence of wireless links; (2) improved performance in sending data over packet networks; (3) improved quality in streaming audio and video flows over packet networks; (4) improved quality in real-time conferencing over packet networks.

The invention claimed is:

1. A method to compute a sending rate r(t) of data, audio or video over a packet switching network in which a user of a client/server machine connects to a client/server machine, comprising:

computing the sending rate r(t) in a rate controller module for delivering data, audio, or video over the packet switching network, the computing being performed as follows:

$$r(t) = k \cdot \left[\min(w(t), s(t)) - \int_{t-RTT}^{t} r(\tau)d\tau\right]^+$$

where:
   a) $[x]+=\max(0,x)$;
   b) k is a proportional constant;
   c) RTT is the round trip time;

d) w(t) is an input function that consists of an Increasing Phase to probe network capacity and a Decreasing Phase that is entered at the end of the Increasing Phase after that network capacity has been hit and after the Decreasing Phase the Increasing Phase is entered again;

e) s(t) is a function that is equal to infinity if no explicit congestion feedback is provided by the network to the sender or is equal to a proper value if a congestion feedback is provided by the network using the computed sending rate determined by the rate controller module for transmitting said data, audio or video.

2. The method according to claim 1, wherein the increasing Phase of the function w(t) is made of two phases:

a) A quick probing phase, during which the function w(t) is set as follows:

$$w(t) = w(t_0) \cdot c^{\frac{t-t_0}{\alpha}}$$

where $t_0$ is the last time the quick probing phase was entered; when w(t) is equal to a threshold value ssthresh, a gentle probing phase is entered;

b) The gentle probing phase, during which the function w(t) is set as follows:

$$w(t) = w(t_0) + \frac{t-t_0}{\beta}$$

where $t_0$ is the time the gentle probing phase was entered.

3. A method according to claim 1, wherein the Decreasing Phase of the function w(t) is set as follows:

a) When the congestion episode is notified at time $t_1$ by means of a feedback report or n duplicate ACKs sent by the receiver to the sender because of a hole in the sequence of received packets, or when the congestion episode is notified by Explicit Congestion Notification (ECN), the function w(t) decreases from the value $w(t_1)$ at time $t_1$ to the value $$w(t_f) = \hat{B}(t_1) \cdot \left(RTT_m + \frac{1}{k}\right)$$

at time $t_f = t_1 + RTT_m$, where $\hat{B}(t_1)$ is the available bandwidth at time $t_1$ and $RTT_m$ is the minimum round trip time; When $t = t_1 + RTT_m$, the setting of w(t) again enters the gentle probing phase;

b) When congestion event at time $t_1$ is notified by timeout, the function w(t) is set as follows:

w(t)=w($t_1$)=2 or fewer segments and the quick probing phase $$w(t) = w(t_1) \cdot c^{\frac{t-t_1}{\alpha}}$$

is entered again with the threshold ssthresh set at the value $$ssthresh = \hat{B}(t_1) \cdot \left(RTT_m + \frac{1}{k}\right)$$

where $\hat{B}(t_1)$ is the available bandwidth at time $t_1$ and $RTT_m$ is the minimum round trip time; when w(t) reaches the ssthresh, then the function w(t) enters the gentle probing phase.

4. A method according to claim 1, wherein the Decreasing Phase of the function w(t) is set as follows:

a) When the congestion episode is notified at time $t_1$ by means of a feedback report or n duplicate ACKs sent by the receiver to the sender because of a hole in the sequence of received packets, or when the congestion episode is notified by Explicit Congestion Notification (ECN), the function w(t) is set as follows:

$$w(t) = w(t_1) - \frac{w(t_1) - w(t_f)}{RTT_m}(t - t_1)$$

where $$w(t_f) = \hat{B}(t_1) \cdot \left(RTT_m + \frac{1}{k}\right)$$

$\hat{B}(t_1)$ is the available bandwidth at time $t_1$, $RTT_m$ is the minimum round trip time and $t_f = t_1 + RTT_m$; When $t = t_1 + Rtt_m$, the function w(t) again enters the gentle probing phase.

b) When congestion event at time $t_1$ is notified by timeout the function w(t) is set as follows:

w(t)=w($t_1$)=2 or few segments and the quick probing phase $$w(t) = w(t_1) \cdot c^{\frac{t-t_1}{\alpha}}$$

is entered again with the threshold ssthresh set at the value $$ssthresh = \hat{B}(t_1) \cdot \left(RTT_m + \frac{1}{k}\right)$$

where $\hat{B}(t_1)$ is the available bandwidth at time $t_1$ and $RTT_m$ is the minimum round trip time; When w(t) reaches the ssthresh, then the function w(t) enters the gentle probing phase.

5. A method according to claim 1, wherein a sample B(i) at time $t = t_i$ of available bandwidth is computed every Round Trip Time (RTT) or every Smoothed Round Trip Time (SRTT), as follows:

$$B(i) = \frac{D(i)}{T(i)}$$

where D(i) is the amount of data received during the last RTT=T(i) or SRT=T(i).

6. A method, to compute available bandwidth $\hat{B}(t)$ that is computed in accordance with claim 5 using a filter with time-varying coefficients.

7. A method to compute the available bandwidth $\hat{B}(t)$ which includes low-pass filtering samples $B_j(t)$ of available bandwidth computed according to claim 5 using the following filter with time-varying coefficients:

$$\hat{B}(i) = \frac{2\tau_f - T(i)}{2\tau_f + T(i)}\hat{B}(i-1) + T(i)\frac{B(i) + B(i)}{2\tau_f + T(i)} \quad 5$$

where $\hat{B}(i)$ is the filter output at time $t_i$, $\hat{B}(i-1)$ is the filter output at time $t_{i-1}$, $B(i)$ is a sample $B(t)$ of available bandwidth computed at $t=t_i$, $\tau_f$ is the time-constant of the filter; when $T(i) > \tau_f/4$ interpolating and re-sampling using
N=integer of $(4 \cdot T(i)/\tau_f)$ virtual samples $B(i)$ arriving with interarrival time $T_v(i) = \tau_f/4$.

8. A method according to claim 5, wherein computing the available bandwidth $\hat{B}(t)$ includes:
    low-pass filtering samples $B(t)$ of available bandwidth using a filter with constant coefficients.

9. A method to compute the available bandwidth $\hat{B}(t)$ which includes:
    low-pass filtering samples $B_i(t)$ of available bandwidth computed in accordance with claim 5 using the following filter with constant coefficients:

$$\hat{B}(i) = \alpha \cdot \hat{B}(i-1) + (1-\alpha) \cdot B(i)$$

where $\hat{B}(i)$ is the filter output at time $t_i$, $\hat{B}(i-1)$ is the filter output at time $t_{i-1}$, $B(i)$ is a sample $B(t)$ of available bandwidth computed at $t_i$ and $\alpha$ is a constant.

10. The method according to claim 1, further including using the rate r(t) for adaptively selecting the quality of coding or the numbers layers to be transmitted using an adaptive coding of an audio/video source.

11. The method according to claim 1, wherein the method is implemented within applications for real-time conferencing over packet networks.

12. The method according to claim 1, wherein the method is implemented within peer-to-peer applications for file-sharing, video streaming or video/audio conferencing over packet networks.

* * * * *